United States Patent
Komatsubara et al.

(10) Patent No.: US 8,578,888 B2
(45) Date of Patent: Nov. 12, 2013

(54) ANIMAL EXCREMENT DISPOSAL SHEET AND MANUFACTURING METHOD THEREOF

(75) Inventors: Daisuke Komatsubara, Kagawa (JP); Takeshi Ikegami, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 0 days.

(21) Appl. No.: 13/513,955

(22) PCT Filed: Oct. 4, 2010

(86) PCT No.: PCT/JP2010/005942
§ 371 (c)(1),
(2), (4) Date: Aug. 20, 2012

(87) PCT Pub. No.: WO2011/121682
PCT Pub. Date: Oct. 6, 2011

(65) Prior Publication Data
US 2013/0206076 A1    Aug. 15, 2013

(30) Foreign Application Priority Data
Mar. 30, 2010   (JP) .................................. 2010-077744

(51) Int. Cl.
*A01K 29/00*    (2006.01)
(52) U.S. Cl.
USPC ........................................ 119/171; 119/172
(58) Field of Classification Search
USPC ......................................... 119/161, 171, 172
See application file for complete search history.

(56) References Cited

U.S. PATENT DOCUMENTS

| | | | |
|---|---|---|---|
| 7,891,320 B2 * | 2/2011 | Otsuji et al. | 119/169 |
| 2005/0000462 A1 * | 1/2005 | Matsuo et al. | 119/171 |
| 2010/0224133 A1 | 9/2010 | Hiroshima et al. | |
| 2011/0146581 A1 * | 6/2011 | Sasano et al. | 119/171 |
| 2012/0103268 A1 * | 5/2012 | Owens | 119/172 |

FOREIGN PATENT DOCUMENTS

| | | |
|---|---|---|
| JP | 2003-088551 | 3/2003 |
| JP | 2009-17819 A | 1/2009 |
| JP | 2009-148169 | 7/2009 |

OTHER PUBLICATIONS

International Search Report from corresponding PCT application No. PCT/JP2010/005942 dated Dec. 28, 2010 (1 pg).

* cited by examiner

*Primary Examiner* — Kimberly Berona
(74) *Attorney, Agent, or Firm* — Brinks Hofer Gilson & Lione

(57) ABSTRACT

An animal excrement disposal sheet that can reduce an area of excrement diffusing on a surface of the sheet. The animal excretion disposal sheet includes a liquid-permeable top sheet, a liquid-impermeable back sheet, and an absorbent layer disposed between the top sheet and the back surface sheet that includes a water absorbent resin and a hydrophilic fiber, in which the absorbent layer further includes a hydrophobizing agent having a higher affinity to the hydrophilic fiber than to the water absorbent resin.

9 Claims, 2 Drawing Sheets

ANIMAL EXCREMENT DISPOSAL SHEET AND MANUFACTURING METHOD THEREOF

RELATED APPLICATION

This application is a 35 U.S.C. §371 national phase filing of International Patent Application No. PCT/JP2010/005942, filed Oct. 4, 2010, through which and to which priority is claimed under 35 U.S.C. §119 to Japanese Patent Application No. 2010-077744, filed Mar. 30, 2010.

TECHNICAL FIELD

The present invention relates to an animal excrement disposal sheet for disposing excrement of a pet such as a dog and a cat, and a manufacturing method thereof.

BACKGROUND ART

An animal excrement disposal sheet for disposing excrement of a pet such as a cat and a dog includes as basic constituents: a liquid permeable top sheet; a liquid impermeable back sheet; and an absorbent layer that is disposed therebetween. The absorbent layer is generally composed of a water absorbent resin and a hydrophilic fiber such as pulp. Here, the water absorbent resin has higher water absorption capacity and higher water retention capacity, but lower water absorption rate than that of the hydrophilic fiber. On the other hand, the hydrophilic fiber has lower water absorption capacity but higher water absorbing rate than that of the water absorbent resin. By combining these advantages and disadvantages, the hydrophilic fiber mainly captures excrement by absorbing and diffusing in an early phase of water absorption, and then the water absorbent resin retains the excrement.

Meanwhile, it is unknown on which part of the animal excrement disposal sheet an animal will excrete. This is a major difference from an absorbent article for human use, of which the excretion position can generally be specified, and a unique problem for an animal excrement disposal sheet. Of course, a sheet that allows repeated excretions is preferable from a viewpoint of reducing effort of changing the sheet and improving cost efficiency of the sheet. However, as described above, it is unknown on which part of the sheet an animal will excrete, and due to animals not willing to excrete in a wet place, the animal tends not to excrete repeatedly on the same part of the sheet.

Accordingly, in order for a sheet to allow multiple excretions, it is required to reduce a diffusion area of excrement on a surface of the sheet after one excretion. In other words, a configuration of an absorbent layer that inhibits diffusion of excrement is a novel required performance, namely a novel problem, for an animal excrement disposal sheet.

In general, hydrophobic treatment of pulp and the like is well known as a sizing agent. However, the sizing agent is primarily used for providing water repellent characteristics to a hydrophilic fiber, and is not known to be used for mild hydrophobic treatment of a hydrophilic fiber in a water absorbent article for excrement, as an animal excrement disposal sheet.

In addition, it is known that an absorbent resin in an absorbent article that is used in contact with a wearer's body is subject to hydrophobic treatment. However, an objective of the treatment is to prevent initial gel blocking by lowering the absorption rate of the absorbent resin. In other words, it is known that liquid is diffused to a hydrophilic fiber by lowering absorption rate of the absorbent resin, but neither is known nor suggested a concept, as described above, for inhibiting diffusion of excrement to the hydrophilic fiber.

SUMMARY OF INVENTION

The present invention provides an animal excrement disposal sheet allowing repeated excretions with one sheet.

As a result of thorough research, the present inventors have found that, by further including a hydrophobizing agent having a higher affinity to a hydrophilic fiber than to a water absorbent resin in an absorbent layer, the hydrophilic fiber can be mildly hydrophobized while maintaining properties of the water absorbent resin such as absorption rate and absorption capacity, thereby inhibiting diffusion of excrement, reducing an excretion area and allowing repeated excretions with one sheet, thereby arriving at completion of the present invention. More specifically, the invention provides the following.

An animal excrement disposal sheet includes: a top sheet having liquid permeability; a back sheet having liquid impermeability; and an absorbent layer that is disposed between the top sheet and the back sheet and includes a water absorbent resin and a hydrophilic fiber, in which the absorbent layer further includes a hydrophobizing agent that hydrophobizes the hydrophilic fiber.

A method for manufacturing the animal excrement disposal sheet described above, includes a step of adhering the hydrophobizing agent onto the surface of the hydrophilic fiber.

A method for manufacturing the animal excrement disposal sheet described above, includes steps of: obtaining a mixture by mixing the water absorbent resin and the hydrophobizing agent at a temperature equal to or higher than the melting point of the hydrophobizing agent; disposing the mixture in the absorbent layer; and transferring the hydrophobizing agent to the surface of the hydrophilic fiber at a predetermined temperature and over a predetermined elapsed time.

DESCRIPTION OF EMBODIMENTS

An embodiment of the present invention is described hereinafter with reference to the drawings. It should be noted that the present invention is not limited thereto, and can be changed and implemented as necessary to implement within the scope of the objective of the present invention.

Overall Structure of Animal Excrement Disposal Sheet

Figure 1:
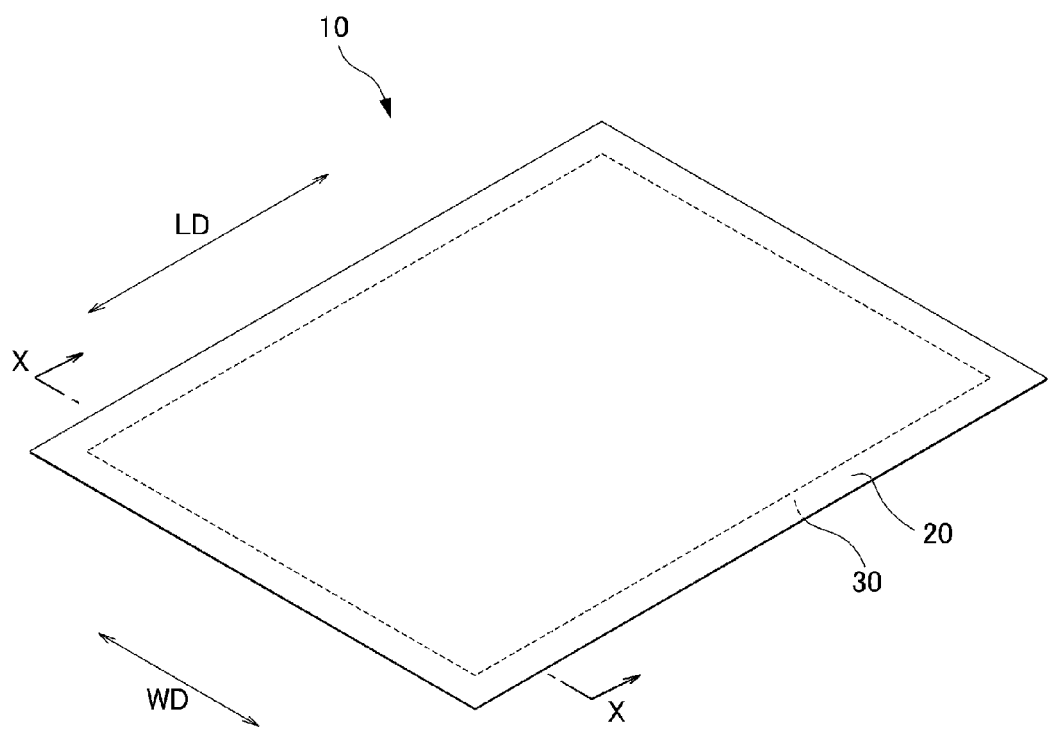
FIG. 1 is an overall perspective view showing an animal excrement disposal sheet of the present invention.
Figure 2:
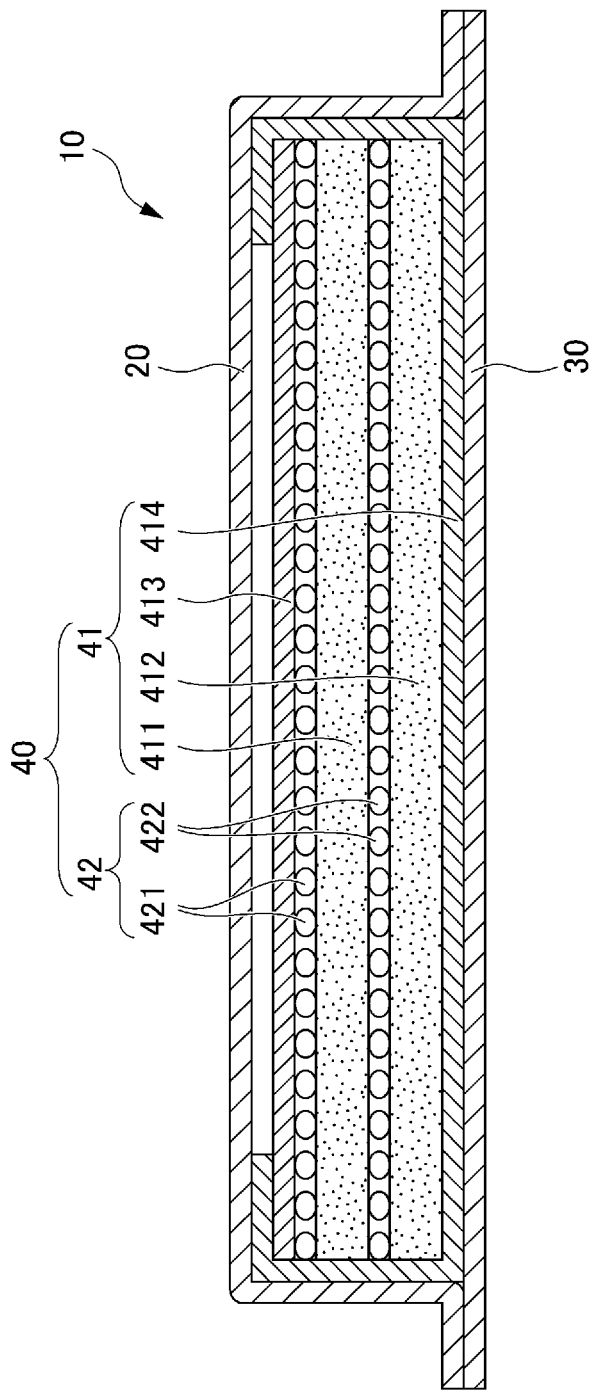
FIG. 2 is a sectional view taken along the line X-X of FIG. 1.

As shown in FIG. 1, an animal excretion disposal sheet 10 of the present invention is formed to be planar as a whole. As shown in FIGS. 1 and 2, the animal excretion disposal sheet 10 includes a liquid-permeable top sheet 20, a liquid-impermeable back sheet 30, and an absorbent layer 40 disposed between the top sheet 20 and the back surface sheet 30 that absorbs and retains a liquid such as excrement. In an outer periphery of the animal excretion disposal sheet 10, the top sheet 20 and the back sheet 30 are joined by a hot melt adhesive.

The size of the animal excretion disposal sheet 10 can be selected appropriately according to the size of the intended animal and/or cage, and is not particularly limited; however, a length in a longitudinal direction (LD) is preferably 30 to 120 cm and a length in a width direction (WD) is preferably 20 to 100 cm. An area of the animal excretion disposal sheet 10 in a planar view is preferable no less than 600 cm$^2$ and no greater than 12000 cm$^2$. In such a configuration, the animal excretion disposal sheet 10 can be preferably placed in a room or other indoor places where animals are kept.

The top sheet 20 is disposed to cover the absorbent layer 40 and passes through the liquid such as excrement toward the absorbent layer 40. The top sheet 20 can be, for example, a liquid permeable nonwoven fabric, though not particularly limited as long as a liquid can pass therethrough. More specifically, a thermal bond nonwoven fabric made of hydrophilic polypropylene fiber, a point bond nonwoven fabric, a through-air nonwoven fabric, a spun-lace nonwoven fabric, a spun-bonded nonwoven fabric, and the like can be used.

The back sheet 30 is disposed on an opposite side to the top sheet 20 across the absorbent layer 40, and constitutes a leak-proof layer in the animal excrement disposal sheet 10. The back sheet 30 is only required to be substantially liquid impermeable, and more specifically, a polyethylene nonporous film and conventionally known films such as polypropylene, polyethylene terephthalate and the like can be used.

Absorbent Layer

In the present invention, the absorbent layer 40 is composed of a hydrophilic fiber 41 and a water absorbent resin 42. As shown in FIG. 2, an upper layer absorbent paper 413, an upper layer water absorbent resin 421, an upper layer hydrophilic fiber 411, a lower layer water absorbent resin 422, a lower layer hydrophilic fiber 412, and a lower layer absorbent paper 414 are stacked in this order from the top sheet 20 side. The lower layer absorbent paper 414 is disposed to cover the entire absorbent layer 40, such that both sides overlap with both end portions of the upper layer absorbent paper 413.

It should be noted that, in FIG. 2, the upper layer water absorbent resin 421 is uniformly dispersed in a boundary between the upper layer absorbent paper 413 and the upper layer hydrophilic fiber 411, and the lower layer water absorbent resin 422 is uniformly dispersed in a boundary between the upper layer hydrophilic fiber 411 and the lower layer hydrophilic fiber 412. It is noted that this diagram is a schematic diagram and, in reality, the water absorbent resin 42 enters in between fibers of the hydrophilic fiber 41. An explanation of how the animal excretion sheets are made is provided in Example 1 below.

In the present embodiment, the upper layer absorbent paper 413, the upper layer hydrophilic fiber 411, the lower layer hydrophilic fiber 412, and the lower layer absorbent paper 414 constitute the hydrophilic fiber 41 of the present invention, and the upper layer water absorbent resin 421 and the lower layer water absorbent resin 422 constitute the water absorbent resin 42 of the present invention; however, in the present invention, the absorbent layer 40 is not limited to such a layered configuration and is only required to include the hydrophilic fiber 41 and the water absorbent resin 42.

An absorbent paper of 10 to 35 g/m$^2$ in basis weight can be preferably used as the upper layer absorbent paper 413 and the lower layer absorbent paper 414. An absorbent paper of no less than 10 g/m$^2$ in basis weight is preferable due to having a superior strength and not being easily breakable, and a absorbent paper of no greater than 35 g/m$^2$ in basis weight is preferable for not excessively absorbing moisture. More preferably, the basis weight thereof is in a range of 15 to 25 g/m$^2$. More specifically, a tissue made of bleached softwood kraft pulp can be used.

It is preferable to use a hydrophilic material and an absorbent material each having a water retention capacity of no greater than 4 times the weight of each as the upper layer hydrophilic fiber 411 and the lower layer hydrophilic fiber 412 constituting a portion of the hydrophilic fiber 41. More specifically, a cellulosic fiber such as fluffed pulp and other pulp, regenerated pulp and wood powder, a nonwoven fabric such as a point bonded nonwoven fabric and a through-air nonwoven fabric, and a foam material can be used such that a total amount of the hydrophilic fiber 41 in the animal excrement disposal sheet 10 is 40 g/m$^2$ to 400 g/m$^2$. As used herein, "water retention capacity" indicates a remaining amount of water absorption after immersing 5 g of a material used as the hydrophilic fiber 41 in water for 10 minutes, and then performing centrifugal dehydration thereof at 150 G for 90 seconds. A surface of the hydrophilic fiber 41 is subjected to a mild hydrophobic treatment by a method described later in detail.

A polymer absorbent body is used as the water absorbent resin 42 consisting of the upper layer water absorbent resin 421 and the lower layer water absorbent resin 422. For example, a resin that is generally highly absorbent such as polyacrylic polymer, starch-acrylic acid polymer and the like can be used. Here, absorption rate of the water absorbent resin 42 is preferably high, and more specifically is preferably no greater than 20 seconds in vortex method described in Examples. By increasing the absorption rate of the water absorbent resin 42 as the hydrophilic fiber is mildly hydrophobized, diffusion of excrement can be prevented more effectively. Thus, a balance of absorption rate and amount between the hydrophilic fiber and the water absorbent resin can be optimized, from a viewpoint of diffusion of excrement in the animal excrement disposal sheet.

Hydrophobizing Agent

A hydrophobizing agent, which is a feature of the present invention, and is included in the absorbent layer 40, is hereinafter described. The hydrophobizing agent is for mildly hydrophobizing the hydrophilic fiber 41. A hydrophobic substance having a higher affinity to the hydrophilic fiber 41 than to the water absorbent resin 42 is suitable. More specifically, higher aliphatic alcohol and higher aliphatic amine can be used as the hydrophobizing agent. Since hydrophobic properties are exhibited by side chains of higher aliphatic group while alcohol and amine have a higher affinity to the hydrophilic fiber 41 than to the water absorbent resin 42 such as acrylic acid, higher aliphatic alcohol and higher aliphatic amine can mildly hydrophobize the hydrophilic fiber 41 without inhibiting water absorbent properties of the water absorbent resin 42. On the other hand, higher aliphatic hydrocarbons (higher alkane) are not preferable due to not having a hydrophilic group and an affinity to the hydrophilic fiber. In addition, higher fatty acids (higher fatty carboxylic acid) are not preferable for the high affinity thereof to the water absorbent resin that also contains carboxylic acid; however, the present invention has different effects depending on adherence method and the like described later, and does not necessarily exclude these substances. The above-mentioned substances are mere examples of preferred modes.

In addition, as described later in detail with experimental examples, the hydrophobizing agent of the present invention has a superior characteristic in that, even in a case where the hydrophobizing agent is initially adhered to the water absorbent resin 42, it transfers over time to the hydrophilic fiber 41 having a higher affinity, thereby hydrophobizing the hydrophilic fiber. According to the present method, even a small amount of the hydrophobizing agent can uniformly adhere to an entirety of the water absorbent resin 42 and uniformly transfer to the hydrophilic fiber 41. As a result, the method can provide a lower diffusion property to the hydrophilic fiber 41 compared to a direct spray method.

The carbon number of the higher aliphatic alcohol or the higher aliphatic amine used for the hydrophobizing agent is preferably no less than 14 and no greater than 20. A carbon number less than 14 is not preferable due to easy liquefaction, difficulty of handling, and risk of insufficient hydrophobic treatment due to run off from the hydrophilic fiber. A carbon number greater than 20 is not preferable due to difficult liquefaction and difficulty in adhering to the hydrophilic fiber. However, the present invention has different effects depending on the adherence method and the like described later, and does not necessarily exclude these substances. The abovementioned carbon numbers are mere examples of preferred modes.

The melting point of the hydrophobizing agent is between 30 to 70 degrees centigrade, preferably 40 to 65 degrees centigrade at normal pressure, measured according to JIS K0064, which stipulates test methods for melting point and melting range of chemical products, under normal pressure. The abovementioned range is preferable because the hydrophobizing agent can sufficiently transfer from the water absorbent resin 42 to the hydrophilic fiber 41 in a low temperature environment and excessive transfer can be inhibited in a high temperature environment.

The amount of the hydrophobizing agent is preferably no less than 0.11% and no greater than 1.1%, and more preferably no less than 0.28% and no greater than 1.1%, by mass with respect to pulp in the hydrophilic fiber. The amount per unit area of the animal excrement disposal sheet is preferably no less than 0.13 g/m$^2$ and no greater than 1.3 g/m$^2$, and more preferably no less than 0.33 g/m$^2$ and no greater than 1.3 g/m$^2$. By setting to within this range proper mild hydrophobization of the hydrophilic fiber can be imparted. The amount of the hydrophobizing agent is measured as follows. First, 30 g of the water absorbent resin 42 was prepared and put into 200 cc of an organic solvent in which additives adhering to the water absorbent resin 42 are soluble, and then the organic solvent containing the water absorbent resin 42 was agitated for 5 hours under ambient temperature and normal pressure. As the organic solvent, toluene was used. After agitating, natural filtration was performed on the organic solvent in which additives are dissolved and the water absorbent resin 42 is contained, whereby the water absorbent resin 42 was separated from the organic solvent in which the additives are dissolved. The solvent was removed with an evaporator from the solution in which the additives are dissolved, and the mass of the residue material was measured. Considering the residue material as the mass of additive, the amount of hydrophobizing agent imparted to the absorbent layer 40 was calculated. It is noted that "normal pressure" in the present specification indicates a state without reducing or applying pressure, in which the pressure is 1 bar ($10^5$ Pa) (100.000 kPa).

Application Method of Hydrophobizing Agent

An application method of the hydrophobizing agent to the absorbent layer 40 is described hereinafter. The application method of the hydrophobizing agent to the absorbent layer 40 is not particularly limited, and the hydrophobizing agent can be provided either directly or indirectly to the hydrophilic fiber 41. As an example of indirectly imparting, it is possible to impart by: mixing the water absorbent resin 42 and the hydrophobizing agent in advance; placing a mixture of the water absorbent resin 42 and the hydrophobizing agent in the absorbent layer 40; and transferring the hydrophobizing agent to the hydrophilic fiber.

An example of a method for mixing the water absorbent resin 42 and the hydrophobizing agent is described hereinafter. A mixture ratio of the hydrophobizing agent to the water absorbent resin 42 can be appropriately set, and for example, is no less than 0.5% and no greater than 2.0% by mass with respect to the water absorbent resin 42. First, the water absorbent resin 42 and the hydrophobizing agent are mixed and put into a heat resistant container; a mixture of the water absorbent resin 42 and the hydrophobizing agent is agitated for 10 minutes while heating the heat resistant container in high-temperature water of a temperature at least equal to the melting point of the hydrophobizing agent; and then cooling the mixture down at ambient temperature to the ambient temperature. In this specification, the ambient temperature is 5 to 35 degrees centigrade. The abovementioned steps are repeated 2 to 3 times as necessary, thereby obtaining a mixture of the water absorbent resin 42 and the hydrophobizing agent. Since the above described mixing process is performed at a temperature higher than a melting point of the hydrophobizing agent, a surface of the water absorbent resin 42 is coated with the hydrophobizing agent.

The water absorbent resin that is coated is dispersed as shown in FIG. 2, for example, by a conventionally known method. Here, an effect of the animal excrement disposal sheet 10 thus obtained is described with reference to Example 1 (Table 3) described later. Example 1 shows an effect of using 1-octadecanol, which is a higher fatty alcohol with a carbon number of 18, as the hydrophobizing agent. As shown in Table 1, diffusion of excrement is initially high (greater than 300 cm$^2$); however, after 10 days at 25 degrees centigrade at normal pressure, and 30% humidity, the diffusion is reduced to 240 cm$^2$. An effect of reducing the diffusion area is thus obtained.

TABLE 1

| Results of Evaluation Over Time at 25 degrees centigrade | |
|---|---|
| Elapsed Time (days) | Diffusion Area (cm$^2$) |
| 0 | 320 |
| 10 | 240 |

As shown in Table 1, since the hydrophobizing agent of the present invention has a higher affinity to the hydrophilic fiber 41 than to the water absorbent resin 42, i.e. the hydrophobizing agent is a hydrophobic substance having a hydrophilic functional group, this substantiates that the hydrophobizing agent transfers over time to the surface of the hydrophilic fiber 41 at a predetermined temperature and reduces the diffusion area. Here, 10 days at 25 degrees centigrade is sufficient as a period of time after manufacture and before use of the animal excrement disposal sheet by a consumer. This substantiates that the mild hydrophobic treatment of the hydrophilic fiber 41 can be performed by leaving for the abovementioned period of time in air at ambient temperature, considering a period of time after manufacture and before selling. Regarding this period of time, since it was confirmed that one day at 50 degrees centigrade is sufficient for reducing the diffusion area, in the following embodiments, the effect of the present invention is confirmed by means of the diffusion area after one day at 50 degrees centigrade at normal and pressure, and 30% humidity.

It should be noted that, in the present invention, the application method of the hydrophobizing agent to the hydrophilic fiber 41 is not limited thereto and the hydrophobizing agent can be dissolved in a solvent such as toluene, and directly sprayed onto the hydrophilic fiber 41.

As described above, according to the present invention, the hydrophobizing agent mixed with the water absorbent resin 42 is directly adhered to the surface of the hydrophilic fiber 41 or is indirectly transferred to a side of the surface of the hydrophilic fiber 41, thereby mildly hydrophobizing the hydrophilic fiber 41. This can reduce a liquid diffusion rate by momentary capillary action between pulps, and more desirably, the diffusion area of excrement can be reduced by interaction with the water absorbent resin 42 that absorbs liquid at a high rate. In addition, this allows for multiple excretions of an animal on one sheet, which is a superior effect that can not conventionally be obtained. The diffusion area, as used herein, can be measured by a method described in Examples.

The present invention is described in further detail hereinafter with reference to Examples.

Production Example

Example 1

The animal excrement disposal sheet 10 of the configuration shown in FIG. 2 was produced with the following materials and by the following method.

In Example 1, a method of transferring the hydrophobizing agent mixed with the water absorbent resin 42 to the hydrophilic fiber 41 was adopted as an application method of the hydrophobizing agent to the absorbent layer 40. A method for mixing the water absorbent resin 42 and the hydrophobizing agent is described hereinafter.

A polymer absorbent body having a 16-second vortex, average particle diameter of 300 mm, water absorption ratio of 60 times, and water retention ratio of 40 times was used as the water absorbent resin 42. The upper layer water absorbent resin 421 was used in an amount of 45 g/m$^2$ and the lower layer water absorbent resin 422 was used in an amount of 21.6 g/m$^2$. It is noted that the value of vortex method was obtained by measurement in the following sequence:
1) setting a 0.9% sodium chloride solution (first grade reagent) to 25 degrees centigrade plus or minus 1 degrees centigrade;
2) putting a rotor and 50 g of the solution of 1) in a 100 ml beaker, and agitating at 600 rpm; and
3) adding 2 g of water absorbent resin to be tested, and measuring an amount of time until movement on a liquid surface stops as a result of swelling with water as the vortex in seconds.

Powdered 1-octadecanol, which is a higher fatty alcohol with a carbon number of 18, was used as the hydrophobizing agent. An amount of the hydrophobizing agent added to the water absorbent resin 42 was 0.5% by mass with respect to the water absorbent resin 42 (such a ratio (mass ratio) of the hydrophobizing agent added to the water absorbent resin 42 and the like is referred to as "treatment ratio" hereinafter. For example, the treatment ratio in the present first embodiment is 0.5%).

First, the water absorbent resin 42 and the hydrophobizing agent were mixed and put into a heat resistant container; a mixture of the water absorbent resin 42 and the hydrophobizing agent was agitated for 10 minutes while heating the heat resistant container in high-temperature water of 80 degrees centigrade (in other Examples, a temperature at least equal to the melting point of the hydrophobizing agent). Then, the mixture of the water absorbent resin 42 and the hydrophobizing agent was cooled down to ambient temperature by leaving at ambient temperature. By repeating the abovementioned steps 2 to 3 times, a mixture of the water absorbent resin 42 and the hydrophobizing agent was obtained.

Next, steps for forming the animal excrement disposal sheet 10 with the top sheet 20, the back sheet 30, and the absorbent layer 40 are described. As the water absorbent resin 42 constituting the absorbent layer 40, the mixture of the water absorbent resin 42 and the hydrophobizing agent obtained in the abovementioned steps was used.

Components of the following specification were used as other constituent members:

top sheet 20: thermal bond nonwoven fabric made with a hydrophilic polypropylene fiber of 18 g/m$^2$ in basis weight;

back sheet 30: polyethylene nonporous film of 18 g/m$^2$ in basis weight;

hydrophilic fiber 41: fluffed pulp uniformly layered to be 60 g/m$^2$ in basis weight; and upper layer absorbent paper 413 and lower layer absorbent paper 414: tissue made of bleached softwood kraft pulp of 14 g/m$^2$ in basis weight.

The animal excrement disposal sheet 10 was manufactured with the above-mentioned constituent members according to the following method. First, the lower layer hydrophilic fiber 412 was placed on the lower layer absorbent paper 414, and then the mixture with the hydrophobizing agent, as the lower layer water absorbent resin 422, was uniformly dispersed thereon. Next, the upper layer hydrophilic fiber 411 was disposed thereon so as to cover the lower layer water absorbent resin 422. On an upper face of the upper layer hydrophilic fiber 411 thus placed, the upper layer water absorbent resin 421, the mixture, was uniformly dispersed again. Afterwards, 0.8 g of water was sprayed onto the upper layer water absorbent resin 421 in order to avoid displacement of the upper layer water absorbent resin 421. Furthermore, the upper layer absorbent paper 413 was disposed thereon so as to cover the upper layer water absorbent resin 421.

An embossed plate was placed on an entirety of the absorbent layer 40, obtained by stacking the lower layer absorbent paper 414, the lower layer hydrophilic fiber 412, the lower layer water absorbent resin 422, the upper layer hydrophilic fiber 411, the upper layer water absorbent resin 421, and the upper layer absorbent paper 413 in this order from the lower side, and then was pressed for 10 seconds at 20 g/cm$^2$, using a hydraulic press. In addition, a flat acrylic plate was placed on the absorbent layer 40, and was pressed for 1 second at 20 g/cm$^2$. Thereafter, the top sheet 20 was disposed on the absorbent layer 40 on a side to the upper layer absorbent paper 413, the back sheet 30 was disposed on the absorbent layer 40 on a side to the lower layer absorbent paper 414, and peripheral portions of the top sheet 20 and the back sheet 30 were joined using a hot melt adhesive.

The animal excrement disposal sheet 10 set as Example 1 was produced according to the above steps, with an overall size of 405 mm (LD) by 300 mm (WD) and in the configuration shown in FIGS. 1 and 2.

Production Example

Comparative Example, Examples 2 to 14, Reference Examples 1 to 7

Comparative Example was prepared by producing Example 1 without using the hydrophobizing agent, i.e. without a step of applying the hydrophobizing agent to the water absorbent resin 42. In addition, Examples 2 to 10 were prepared by producing Example 1 by changing the treatment ratio of the hydrophobizing agent and the member to which the hydrophobizing agent is applied as shown in Table 3. Moreover, Examples 11 and 12 and Reference Example 1 were prepared by producing Example 1 by way of changing the carbon number of the higher aliphatic alcohol used as the hydrophobizing agent as shown in Table 4. Additionally, Example 13 was prepared by producing Example 1 by way of using a higher aliphatic amine in place of the higher aliphatic alcohol used as the hydrophobizing agent. Furthermore, Example 14 and Reference Example 2 were prepared by producing Example 1 by way of changing a dispersion position of the water absorbent resin 42. In addition, Reference Examples 3 to 5 were prepared by producing Example 1 by way of using a higher fatty acid in place of the higher aliphatic alcohol used as the hydrophobizing agent. Moreover, Reference Examples 6 and 7 were prepared by producing Example 1 by way of using a higher hydrocarbon in place of the higher aliphatic alcohol used as the hydrophobizing agent.

Experimental Example 1

Evaluation results of an effect of dispersion reduction of the animal excrement disposal sheet 10 for the Examples, Comparative Example, and Reference Examples are shown in Tables 3 to 6.

It should be noted that the effect of dispersion reduction of the animal excrement disposal sheet 10 was measured in the following sequence.

1) A cylinder (60 mm in diameter, 55 g in weight) was placed in a central portion of the animal excrement disposal sheet 10 that was left for 1 day in an uncompressed state with the top sheet thereof facing upward in a temperature-controlled room at 50 degrees centigrade, a burette for dropping artificial urine that drops 80 ml in 10 seconds was set in a central portion of the cylinder 10 mm above an upper face of the animal excrement disposal sheet 10, and then 80 ml of a 0.9% normal saline solution was dropped. At this time, the starting time of dropping was set to 0.

2) A period of time until the normal saline solution of a boundary between the cylinder and the animal excrement disposal sheet 10 disappears as a result of absorption by the animal excrement disposal sheet 10 was set as an absorption rate.

3) Two minutes after dropping, diffusion lengths of the normal saline solution from a longer side and a shorter side of a product were measured. The diffusion area was obtained by the following sequence. The maximum diffusion on the longer side (a) (mm) and the maximum diffusion on the shorter side (b) (mm) of an oval diffusion were measured, and the diffusion area was calculated using the area formula for an ellipse as following:

$$\text{Diffusion area (cm}^2) = (a)/2 \times (b)/2 \times n \times 0.01.$$

TABLE 2

| Symbols | Hydrophobizing Agent | Name of Substance | Carbon Number | Melting Point |
|---|---|---|---|---|
| A | Higher Aliphatic Alcohol | 1-Octadecanol | 18 | 59 |
| B | Higher Aliphatic Alcohol | Tetradecyl Alcohol | 14 | 34 |
| C | Higher Aliphatic Alcohol | Eicosanol | 20 | 65 |
| D | Higher Aliphatic Alcohol | Trianthenol | 30 | 86 |
| E | Higher Aliphatic Amine | Stearylamine | 18 | 53 |
| F | Higher Fatty Acid | Stearic Acid | 18 | 70 |
| G | Higher Fatty Acid | Myristic Acid | 14 | 54 |
| H | Higher Fatty Acid | Palmitic Acid | 16 | 62 |
| I | Higher Hydrocarbon | Tetracosane | 24 | 54 |
| J | Higher Hydrocarbon | Octacosane | 28 | 64 |

The name, carbon number, and melting point of the hydrophobizing agent used in the present Experimental Example are as shown in Table 2. Each hydrophobizing agent is referred to in symbols hereinafter.

TABLE 3

| | Water Absorbent Resin | | | | | | Hydrophilic Fiber | | | | Amount | |
|---|---|---|---|---|---|---|---|---|---|---|---|---|
| | Upper Layer Water Absorbent Resin | | | Lower Layer Water Absorbent Resin | | | Upper Layer Hydrophilic Fiber | | Lower Layer Hydrophilic Fiber | | of Hydro phobizing | Diffusion Area of 80 |
| | Hydro phobizing Agent | Treat- ment Ratio | Amount Used (g/P) | Hydro phobizing Agent | Treat- ment Ratio | Amount Used (g/P) | Hydro phobizing Agent | Treat- ment Ratio | Hydro phobizing Agent | Treat- ment Ratio | Agent Added (g/m²) | ml (cm²) 50° C. 1 day |
| Comparative Example | — | — | 5.45 | — | — | 2.62 | — | — | — | — | — | 298.5 |
| Example 1 | A | 0.5 | 5.45 | A | 0.5 | 2.62 | — | — | — | — | 0.3321 | 226.7 |
| Example 2 | A | 0.2 | 5.45 | A | 0.2 | 2.62 | — | — | — | — | 0.1328 | 258.4 |
| Example 3 | A | 1.0 | 5.45 | A | 1.0 | 2.62 | — | — | — | — | 0.6642 | 220.2 |
| Example 4 | A | 2.0 | 5.45 | A | 2.0 | 2.62 | — | — | — | — | 1.3284 | 213.5 |
| Example 5 | — | — | 5.45 | — | — | 2.62 | — | — | A | 0.2 | 0.1328 | 298.3 |
| Example 6 | — | — | 5.45 | — | — | 2.62 | — | — | A | 0.5 | 0.3321 | 271.3 |
| Example 7 | — | — | 5.45 | — | — | 2.62 | — | — | A | 1 | 0.6642 | 261.4 |
| Example 8 | — | — | 5.45 | — | — | 2.62 | A | 0.2 | — | — | 0.1328 | 290.7 |
| Example 9 | — | — | 5.45 | — | — | 2.62 | A | 0.5 | — | — | 0.3321 | 268.5 |
| Example 10 | — | — | 5.45 | — | — | 2.62 | A | 1 | — | — | 0.6642 | 261.4 |

As shown in the results in Table 3, in the present invention, in a case where the higher aliphatic alcohol was mixed with the water absorbent resin 42 (Examples 1 to 4), at least a 10% reduction in the diffusion area was observed (226.7 cm² in diffusion area in Example 1) compared to the Comparative Example (298.5 cm² in diffusion area). In a case where the treatment ratio of the hydrophobizing agent was in a range of 0.2% to 2.0%, the diffusion area decreased as the treatment ratio increased. It should be noted that "g/P", i.e. grams per one sheet, in Tables 3 to 6 indicates an amount used (g) of the water absorbent resin, to which the hydrophobizing agent has added in 1 sheet of the animal excrement disposal sheet 10.

It should be noted that, with the treatment ratio of 0.2% in Example 2, the amount of the hydrophobizing agent added is 0.1328 g/mm² (A), and the total amount of pulp in upper and lower layers (60 g/m² each) is 120 g/m² (B). Therefore, a ratio by mass of the hydrophobizing agent with respect to the pulp is A/B (%), which is (0.1328/120) multiplied by 100=0.11%. Similarly, the ratio by mass of the hydrophobizing agent with respect to the pulp is 0.28% with the treatment ratio of 0.5% in Example 1, 0.55% with the treatment ratio of 1.0%, and 1.11% with the treatment ratio of 2.0%. As a result, a preferable range for the ratio by mass of the hydrophobizing agent with respect to the pulp is no less than 0.11% and no greater than 1.1%.

In a case where the hydrophobic treatment was directly applied to the hydrophilic fiber 41 using a higher aliphatic alcohol (Examples 5 to 10), when the hydrophobic treatment was applied to the upper layer hydrophilic fiber 411, at least a 10% reduction in the diffusion area was observed with the treatment ratio of at least 0.5%, compared to the Comparative Example. In a case where the hydrophobic treatment was applied to the lower layer hydrophilic fiber 412, at least a 10% reduction in the diffusion area was observed with the treatment ratio of at least 1%, compared to the Comparative Example.

TABLE 4

| | Water Absorbent Resin | | | | | | Hydrophilic Fiber | | | | Amount of | |
| | Upper Layer Water Absorbent Resin | | | Lower Layer Water Absorbent Resin | | | Upper Layer Hydrophilic Fiber | | Lower Layer Hydrophilic Fiber | | Hydro phobizing | Diffusion Area of 80 |
| | Hydro phobizing Agent | Treat- ment Ratio | Amount Used (g/P) | Hydro phobizing Agent | Treat- ment Ratio | Amount Used (g/P) | Hydro phobizing Agent | Treat- ment Ratio | Hydro phobizing Agent | Treat- ment Ratio | Agent Added (g/m²) | ml (cm²) 50° C. 1 day |
|---|---|---|---|---|---|---|---|---|---|---|---|---|
| Comparative Example | — | — | 5.45 | — | — | 2.62 | — | — | — | — | — | 298.5 |
| Example 11 | B | 0.5 | 5.45 | B | 0.5 | 2.62 | — | — | — | — | 0.3321 | 268.5 |
| Example 12 | C | 0.5 | 5.45 | C | 0.5 | 2.62 | — | — | — | — | 0.3321 | 249.8 |
| Reference Example 1 | D | 0.5 | 5.45 | D | 0.5 | 2.62 | — | — | — | — | 0.3321 | 350.8 |
| Example 13 | E | 0.5 | 5.45 | E | 0.5 | 2.62 | — | — | — | — | 0.3321 | 222.9 |

As shown in the results in Table 4, in the present invention, in a case where the carbon number of the higher aliphatic alcohol used as the hydrophobizing agent was less than 30 (Example 11 and 12), at least a 10% reduction in the diffusion area was observed compared to the Comparative Example. In a case where the carbon number was 30 (Reference Example 1), the diffusion area was not reduced.

As shown in the results in Table 4, in the present invention, in a case where the higher aliphatic amine was used (Example 13), as in a case where the higher aliphatic alcohol was used, a great reduction in the diffusion area was observed compared to the Comparative Example.

TABLE 5

| | Water Absorbent Resin | | | | | | Hydrophilic Fiber | | | | Amount | |
| | Upper Layer Water Absorbent Resin | | | Lower Layer Water Absorbent Resin | | | Upper Layer Hydrophilic Fiber | | Lower Layer Hydrophilic Fiber | | of Hydro phobizing | Diffusion Area of 80 |
| | Hydro phobizing Agent | Treat- ment Ratio | Amount Used (g/P) | Hydro phobizing Agent | Treat- ment Ratio | Amount Used (g/P) | Hydro phobizing Agent | Treat- ment Ratio | Hydro phobizing Agent | Treat- ment Ratio | Agent Added (g/m²) | ml (cm²) 50° C. 1 day |
|---|---|---|---|---|---|---|---|---|---|---|---|---|
| Comparative Example | — | — | 5.45 | — | — | 2.62 | — | — | — | — | — | 298.5 |
| Example 14 | A | 0.5 | 8.07 | — | — | — | — | — | — | — | 0.3321 | 275.9 |
| Reference Example 2 | — | — | — | A | 0.5 | 8.07 | — | — | — | — | 0.3321 | 337.9 |

As shown in the results in Table 5, in the present invention, in a case where the hydrophobic treatment was applied only to the upper layer water absorbent resin 421 (Example 14), a slight reduction in the diffusion area was observed compared to the Comparative Example. In a case where the hydrophobic treatment was applied only to the lower layer water absorbent resin 422 (Reference Example 2), no reduction in the diffusion area was observed compared to the Comparative Example.

TABLE 6

| | Water Absorbent Resin | | | | | | Hydrophilic Fiber | | | | Amount of | |
| --- | --- | --- | --- | --- | --- | --- | --- | --- | --- | --- | --- | --- |
| | Upper Layer Water Absorbent Resin | | | Lower Layer Water Absorbent Resin | | | Upper Layer Hydrophilic Fiber | | Lower Layer Hydrophilic Fiber | | Hydro phobizing | Diffusion Area of 80 |
| | Hydro phobizing Agent | Treat- ment Ratio | Amount Used (g/P) | Hydro phobizing Agent | Treat- ment Ratio | Amount Used (g/P) | Hydro phobizing Agent | Treat- ment Ratio | Hydro phobizing Agent | Treat- ment Ratio | Agent Added (g/m²) | ml (cm²) 50° C. 1 day |
| Comparative Example | — | — | 5.45 | — | — | 2.62 | — | — | — | — | — | 298.5 |
| Reference Example 3 | F | 0.5 | 5.45 | F | 0.5 | 2.62 | — | — | — | — | 0.3321 | 306.0 |
| Reference Example 4 | G | 0.5 | 5.45 | G | 0.5 | 2.62 | — | — | — | — | 0.3321 | 305.8 |
| Reference Example 5 | H | 0.5 | 5.45 | H | 0.5 | 2.62 | — | — | — | — | 0.3321 | 306.0 |
| Reference Example 6 | I | 0.5 | 5.45 | I | 0.5 | 2.62 | — | — | — | — | 0.3321 | 321.9 |
| Reference Example 7 | J | 0.5 | 5.45 | J | 0.5 | 2.62 | — | — | — | — | 0.3321 | 328.1 |

As shown in the results in Table 6, in the present invention, in a case where the higher fatty acid or higher hydrocarbon was used as the hydrophobizing agent (Reference Examples 3 to 5 or 6 and 7), no reduction in the diffusion area was observed compared to the Comparative Example.

According to the animal excrement disposal sheet 10 of the present invention, the diffusion area of excrement on the animal excrement disposal sheet 10 can be reduced by a novel method of mildly hydrophobizing the hydrophilic fiber 41 using a hydrophobizing agent having a higher affinity to the hydrophilic fiber 41 than to the water absorbent resin 42.

According to the present invention, the hydrophilic fiber can be mildly hydrophobized while maintaining properties of the water absorbent resin such as absorption rate and absorption capacity. Conventionally, excrement has been diffused due to absorption by the hydrophilic fiber in a few seconds before absorption by the water absorbent resin; however, the present invention can inhibit diffusion of excrement by lowering diffusion rate by mildly hydrophobizing the hydrophilic fiber. Since the water absorbent resin can start absorbing in this state, diffusion of excrement can be inhibited and an area of excrement diffusing on a surface of the sheet can be accordingly reduced. This action is more effective when combined with a water absorbent resin having high absorption rate. As a result, a sheet of the animal excrement disposal sheet allows multiple excretions. This can extend the duration of use of the excrement disposal sheet and extend exchange frequency thereof, thereby providing a cost effective excrement disposal sheet.

The invention claimed is:

1. An animal excrement disposal sheet comprising:
   a top sheet having liquid permeability;
   a back sheet having liquid impermeability; and
   an absorbent layer that is disposed between the top sheet and the back sheet and includes a water absorbent resin and a hydrophilic fiber,
   wherein the absorbent layer further includes a hydrophobizing agent that hydrophobizes the hydrophilic fiber.

2. The animal excrement disposal sheet according to claim 1, wherein the hydrophobizing agent is present on a surface of the hydrophilic fiber.

3. The animal excrement disposal sheet according to claim 1,
   wherein the hydrophobizing agent is a higher aliphatic alcohol or a higher aliphatic amine.

4. The animal excrement disposal sheet according to claim 3, wherein a carbon number of the higher aliphatic alcohol or the higher aliphatic amine is no less than 14 and no greater than 20.

5. The animal excrement disposal sheet according to claim 3,
   wherein a melting point of the higher aliphatic alcohol or the higher aliphatic amine is no lower than 30 degrees centigrade and less than 70 degrees centigrade.

6. The animal excrement disposal sheet according to claim 1,
   wherein an amount of the hydrophobizing agent added to the absorbent layer is no less than 0.11% and no greater than 1.1% by mass with respect to pulp in the hydrophilic fiber.

7. The animal excrement disposal sheet according to claim 1,
   wherein a diffusion area as viewed from the top sheet side 2 minutes after dropping in 10 seconds 80 ml of saline inside a cylinder having a diameter of 60 mm is no greater than 300 cm².

8. A method for manufacturing the animal excrement disposal sheet according to claim 1,
   comprising a step of adhering the hydrophobizing agent onto the surface of the hydrophilic fiber.

9. A method for manufacturing the animal excrement disposal sheet according to claim 1, comprising steps of:
   obtaining a mixture by mixing the water absorbent resin and the hydrophobizing agent at a temperature equal to or higher than a melting point of the hydrophobizing agent;
   disposing the mixture in the absorbent layer; and
   transferring the hydrophobizing agent to the surface of the hydrophilic fiber at a predetermined temperature and over a predetermined elapsed time.

* * * * *